May 14, 1935.  J. A. WILSON  2,001,232
KNIFE
Filed June 13, 1932
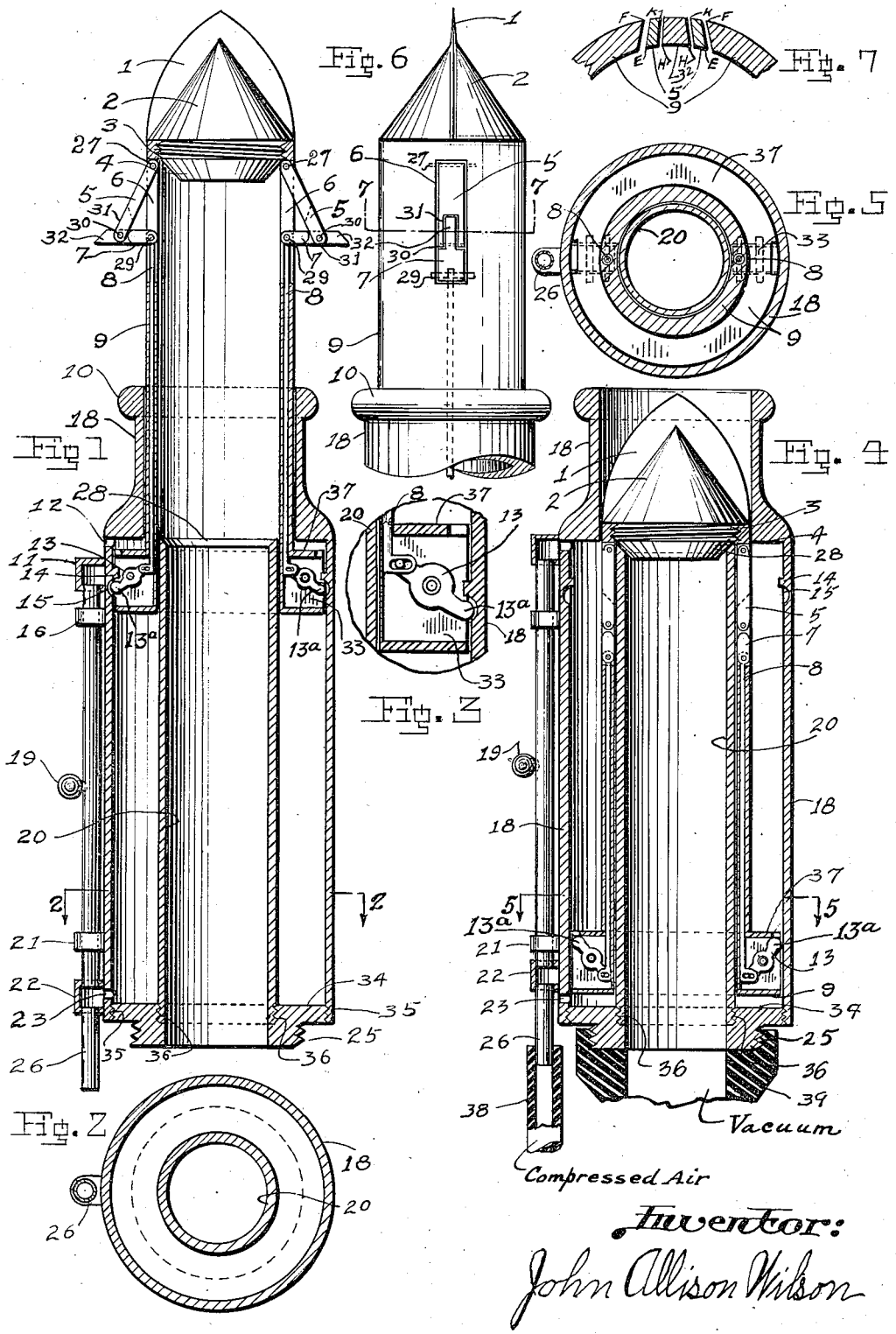
Inventor:
John Allison Wilson Patented May 14, 1935

2,001,232

UNITED STATES PATENT OFFICE 2,001,232

KNIFE

John Allison Wilson, South Pasadena, Calif.

Application June 13, 1932, Serial No. 616,859

5 Claims. (Cl. 17—1)

This invention relates to improvements in slaughtering devices and methods in which the animal is to be killed by severing the two arteries that cross near the larynx, with a knife having a hollow stem and drawing the blood through the stem by vacuum means and the primary object of the invention is to provide an improved knife for severing the arteries of the animal being killed.

First, by providing a hollow handle, composed of two tubes, forming a slidably extendable hollow stem, entirely free from obstructions, through which the blood is to be drawn by the aid of a vacuum.

Second, by providing means to automatically and simultaneously operate all parts of the device in order that no time shall elapse between the time of the thrust of the blade and the action of the vacuum.

Third, to provide means for shearing any portion of meat or other substance that may be drawn between any two parts by the action of the vacuum during the time of bleeding so as to insure the free removal of the device from the wound.

Fourth, to provide means for the operation of all movable parts by a mechanical force in contradistinction to the inhumane method of thrusting the blade of a knife into the throat of an animal by the hand of the operator.

Fifth, to provide a metal case capable of housing all movable parts when they are not in use and to confine fluid pressure to be applied to a piston.

Sixth, to provide means for disassembling the device for cleaning.

Other objects of the invention will appear in the following detailed description, taken in connection with the drawing forming a part of this specification in which drawing:

Figure 1 is a longitudinal section of the device showing the blade and the upper portion of the movable part of the slidably extendable hollow stem thrust from the case, in the position assumed after the blade has severed the arteries in the throat of an animal, the blood being drawn from the wound by a vacuum;

Figure 2 is a cross-section taken along the line 2—2 of Figure 1;

Figure 3 represents an enlarged fragmentary view of a portion of the structure shown in Fig. 1, and shows one of the dogs in its extreme upward position;

Figure 4 is a longitudinal-sectional view of the device, showing the blade and the movable part of the slidably extendable hollow stem drawn within the case;

Figure 5 is a cross-section taken along the line 5—5 of Figure 4;

Figure 6 is a side-view of the upper portion of the device shown in Figure 1; and Figure 7 is an enlarged fragmentary section along the line 7—7 of Figure 6.

Referring to the drawing in detail wherein similar reference characters indicate corresponding parts throughout the several views:

The blade 1 may be of any desired configuration and as shown is in the shape of an arrow head, sharp at both edges and of a width designed to cut a hole in the flesh of the animal only large enough to permit the stem 9 to follow the blade 1 into the wound. The blade 1 may be fastened into the stem 9 in any substantial manner. I have securely fastened it into a slot formed in the middle of a cone 2 which is threadedly mounted to the upper end of stem 9 by means of threads 3. In the wall of stem 9, directly below the end thereof, there are two oppositely disposed longitudinally extending slots 6 which permit the entrance of the blood into the stem and form recesses into which the links 5, the leaves 7 and the projections 32 of the leaves 7 are drawn, to prevent them from catching against the upper end of the case, while the movable part 9 is being returned to the case, after the animal has been bled. Links 5 and leaves 7 form means for spreading the wound made by the blade 1 and to hold the device from displacement. The links 5 are pivotally connected as at 27 to the wall of the stem 9, the leaves 7 are pivotally connected as at 29 to the upper ends of the rods 8, links 5 and leaves 7 of each pair are hingedly connected together as at 30, and the lower ends of rods 8 are pivotally connected to the dogs 13 which are designed to rotate and move the rods 8 upward or downward, forming means for operating the leaves and links. The leaf 7 of each pair has a relatively narrower portion 32 which extends from a point near the middle of the leaf to the outer extremity. The leaf is pivoted by means of the reduced portion, near the middle, to the link 5, which is slotted at 31 so as to form a fork to receive the leaf 7 when the leaf and the link lie in a straight line. When the rods 8 are moved upwardly as in Figure 1, the leaves and links will swing outwardly, opening the slots 6, spreading the wound made by the blade, clearing the slots 6, allowing the blood to flow, unobstructed, into the slidably extendable hollow stem. When the links 5 and leaves 7 move outwardly, the projections 32 will penetrate the walls of the wound, serving to hold the device securely in place. When the rods 8 are moved downwardly, as in Figure 4, the projections 32 will be drawn into the slots 31 and the links 5 and leaves 7 will be drawn into slots 6. The outer edges of slots 6, the inner edges of links 5 and leaves 7, the outer edges of slots 31 and the inner edges of projections 32 are provided with sharp, scissors-like edges, being so designed for the purpose of shearing any portion of meat or other substance that may be drawn between the links 5 and leaves 7 and the stem 9 adjacent the slots 6 or between the projections 32 and the slots 31, during the action of the vacuum. The process of shearing is illustrated by Figure 7 and is accomplished as follows: edges E and E, on the inner sides of links 5 and leaves 7 shear against edges F and F, on the outside of slots 6, in stem 9, edges H and H, on the inner sides of projections 32, shear against edges K and K, on the outside of slots 31, in links 5. Coacting sides of the slots 6 and 31 and the edges of the links and leaves 5 and 7 are inclined in the same direction to prevent binding. At the base of cone 2 and made a part of the cone, I have formed a valve 4, designed to fit into a valve seat 28 formed within the upper end of the stationary part 20 of the slidably extendable hollow stem. When the valve 4 is lifted from the valve seat 28, the links 5 and leaves 7 are forced out of the slots 6, and the projections 32 penetrate the walls of the wound, the blade 1 having severed the arteries. The blood will be drawn by the action of the vacuum, through slots 6 and the slidably extendable hollow stem, to a hose 39 connected by means of the threads 25 to the bottom annular member 34, to which the tube 20 is threadedly fastened, as at 35. The case is designed to house all of the parts that are associated with the movable part of the extendable stem, when the apparatus is not in use. The case also acts as a cylinder for confining compressed air or other motive power. The upper portion of case 18 is made smaller than the lower portion and a rounded, thickened edge or collar 10 is formed around the top, so designed to fit against the flesh of the animal to prevent leakage of blood around the stem 9. The inside of the upper portion of the case 18 is made smooth and true, designed to slidably fit around the upper portion of the movable part 9 of the slidably extendable hollow stem. The inside of the greater portion of the case 18 is made smooth and true, designed to slidably fit around the portion 37 of the extensible part 9 of the stem, which constitutes a piston, the purpose of which will be shown later. Within the piston 37, diametrically opposed slots 33 are formed, in which dogs 13 are pivotally mounted, designed to operate the rods 8, connected to leaves 7. The top of case 18 is open for the thrust of the blade and the upper portion of the stem 9, a bottom annular member 34 is threadably fastened inside of the bottom of the case, by means of threads 35. The stationary part 20 of the slidably extendable hollow stem is threadably fastened into an opening in the bottom annular member 34 by threads 36. In the wall of the case 18 are two holes or ports, port 23 being located near the bottom of the case and port 12, directly above port 23 and near the top of the larger portion of the case, designed to admit compressed air or other compressed fluid into either end of the case, at the will of the operator. A metal tube 26 is slidably mounted by clamps 16 and 21, to the outside of the case, directly outside of the ports 12 and 23. Two enlarged places 11 and 22 on tube 26 have openings therein, adjacent the case and are designed to admit air into the case, through ports 12 and 23 as required, the air being supplied through a hose 38, connected to the lower end of tube 26, the tube being moved to the position desired by pressure against knob 19.

In the operation of the improved device, the upper end of case 18 as shown in Figure 4, is pressed against the throat of the animal, at the place where the wound is to be made, the operator then presses the knob 19 to place the tube 26 in the position shown in Figure 1, and the air then rushes through port 23 into the case 18, exerting a force against the piston 37 of the slidably extendable hollow stem, which causes the upper portion to be suddenly extended above the case, and the blade 1 will enter the flesh of the animal and under the guidance of a skilled sticker, will sever the throat arteries, thereby killing the animal. When part 9 moves upward, the air then contained within the case, above the piston 37 will be forced out of the case, through port 12, and the valve 4 will be lifted from the valve seat 28, thereby releasing the action of the vacuum at the same instant that the blade enters the flesh of the animal. When part 9 has almost completed its movement, the dogs 13 engage the lugs 14 and are caused to rotate and move the rods 8 upwardly, causing the links 5 and leaves 7 to swing outwardly, in which position they hold the flesh away from slots 6, and the projections 32 will penetrate the walls of the wound and hold the device securely in place until the bleeding is complete. To release the blade and remove it from the wound, the operator presses the knob 19 and moves the tube 26 to the position shown in Figure 4, causing the air to rush into the case, through port 12 and the force exerted against the piston 37, formed on the lower portion of part 9, will cause part 9 to move downward, thereby withdrawing the blade 1 and returning the upper portion of part 9, the blade 1, the hinged links 5 and leaves 7 and the projections 32, to the inside of the case. When the movable part 9 starts downward, the dogs 13, then being engaged in the nicks 15, will rotate, pulling downward on rods 8, drawing the links 5 and leaves 7 into the slots 6, removing the projections 32 from the walls of the wound into the slots 31, in which position the links 5 and leaves 7 and the projections 32 will be drawn into the case 18 without catching on the upper edge of the case. The relation of the end 13a of the dog 13 to the nick 15 is such that after the retractile motion of part 9 has begun, the dog 13 is rotated about its axis sufficiently to permit the end 13a to leave the nick 15 and to glide along the wall of the case 18 until the part 9 has reached its lowermost position. When part 9 has almost reached its uppermost position, the end 13a of the dog 13 engages the lug 14 and is thus compelled to enter the nick 15, thus causing the link 5 and the leaf 7, through the rod 8, to be projected outwardly.

The device can be readily disassembled for cleaning, by removing the anular member 34 and the tube 20, when the parts of the device are in the relation indicated in Figure 4. Then the movable member 9 and its associated parts may be removed.

I am aware that prior to my invention, devices have been made designed to be used in connection with a method and apparatus for removing blood from animals in process of slaughtering, invented by me and patented September 12, 1922 under Patent No. 1,428,672. I therefore do not claim such combination broadly, but I claim:

1. In a slaughtering device, the combination of a casing adapted to be held by an operator, a cylinder slidably mounted within the casing, an annular bottom member fixed to the lower end of the casing, a tube within the cylinder attached to the annular member, a knife blade mounted on the upper end of the cylinder, means pivotally attached to the walls of the cylinder, and an annular piston formed on the bottom of the cylinder, adapted to be actuated by fluid pressure to move said cylinder and position the first named means projecting outwardly from the walls of the cylinder or in alignment therewith, whereby the cylinder may be fully extended so as to maintain the blade in a wound made thereby and to maintain the blade within the casing when the first-named means has been moved to aligned position with the walls of the cylinder.

2. In a slaughtering device, the combination of a stationary casing, an annular member at the lower end thereof, a cylinder slidably mounted therein and having oppositely disposed longitudinally extending slots at the upper end thereof, links pivoted within the slots, leaves connected to the links and adapted to be positioned within the slots, a tube within the cylinder attached to the annular member, a valve arranged within the upper end of the cylinder, a valve-seat formed on the upper end of the tube, means for moving the valve out of the valve-seat, said means including a piston slidably mounted within the casing and around the tube and having rods pivotally connected to the leaves, dogs connected to the lower ends of the rods and attached to the piston, said casing having lugs and recesses near the upper ends of the walls thereof to engage the dogs, and means whereby fluid pressure may be applied to the piston to cause movement thereof relative to the casing, whereby the cylinder may be moved and maintained in an outwardly exposed or inwardly confined position relative to the casing.

3. In a slaughtering device, the combination of a stationary casing, an annular member at the lower end thereof, a cylinder slidably mounted therein having oppositely disposed longitudinally extending slots at the upper end thereof, links pivoted within the slots, leaves connected to the links and adapted to be positioned within the slots, a tube within the cylinder attached to the annular member, a knife blade mounted on the upper end of the cylinder, a valve arranged within the upper end of the cylinder, a valve-seat formed on the upper end of the tube, means for moving the valve out of the valve-seat, thrusting the blade into the flesh of the animal and for thrusting the points of the leaves into the walls of the wound formed by the blade, said means including an annular piston, formed on the bottom of the cylinder, slidably mounted within the casing and around the tube, and having rods pivotally connected to the leaves, dogs connected to the lower ends of the rods and attached to the piston, said casing having lugs and recesses near the upper ends of the walls thereof to engage the dogs and means whereby fluid pressure may be applied to the piston to cause movement thereof relative to the casing, whereby the cylinder may be moved and maintained in an outwardly exposed or inwardly confined position relative to the casing.

4. In a slaughtering device, the combination of a casing adapted to be held by an operator, a cylinder slidably mounted therein and having oppositely disposed longitudinally extending slots, with sharp scissors-like edges at the upper end thereof, a bottom annular member fixed to the lower end of the casing, a tube within the cylinder attached to the annular member, a knife blade mounted on the upper end of the cylinder, links, with sharp scissors-like edges, pivoted within the slots, leaves, with sharp scissors-like edges, connected to the links and an annular piston formed on the bottom of the cylinder adapted to be actuated by a fluid pressure to move said cylinder and position said leaves and links projecting outwardly from the slots in the walls of the cylinder or draw them into the slots, in alignment with the cylinder with a shearing action.

5. In a slaughtering device, the combination of a stationary cylindrical casing partially closed at its upper end by an annular integral closure and partially closed at its lower end by a separate annular closure, a stationary inner cylindrical tube secured to the last named annular closure and spaced from and within the walls of the cylindrical casing, a cylinder slidably mounted within the casing and on the outer surface of the stationary tube, said tube having a valve-seat at its upper end, said cylinder having a corresponding valve at its upper end and an integral annular piston at its lower end, said cylinder having oppositely disposed longitudinally extending slots at the upper end thereof, links pivoted within the slots, leaves connected to the links and adapted to be positioned within the slots, rods slidably disposed within the walls of the cylinder and pivotally connected with the leaves, dogs connected to the lower ends of the rods and pivotally attached to the piston, said casing having lugs and recesses near the upper ends of the walls thereof to engage the dogs, and means whereby fluid pressure may be applied to the piston to cause movement thereof relative to the casing, whereby the cylinder may be maintained in an outwardly exposed or inwardly concealed position relative to the casing.

JOHN ALLISON WILSON.